United States Patent [19]

Takei et al.

[11] Patent Number: 4,746,949
[45] Date of Patent: May 24, 1988

[54] IMAGE SENSING APPARATUS

[75] Inventors: Masahiro Takei, Kanagawa; Tadashi Okino, Tokyo, both of Japan

[73] Assignee: Canon Kabushiki Kaisha, Tokyo, Japan

[21] Appl. No.: 907,139

[22] Filed: Sep. 12, 1986

Related U.S. Application Data

[63] Continuation of Ser. No. 682,797, Dec. 18, 1984.

[30] Foreign Application Priority Data

Dec. 22, 1983 [JP] Japan ................................ 58-243447

[51] Int. Cl.[4] .............................................. G03B 7/08
[52] U.S. Cl. .................................... 354/429; 352/169
[58] Field of Search ................ 354/410, 425, 429–434, 354/441, 442, 446, 449, 451, 271.1; 352/141, 169, 180; 358/228

[56] References Cited

U.S. PATENT DOCUMENTS

| | | | |
|---|---|---|---|
| 3,887,930 | 6/1975 | Bresson | 354/195.12 |
| 3,889,276 | 6/1975 | Shirai | 354/132 |
| 4,176,930 | 12/1979 | Imura | 354/195.12 |
| 4,202,610 | 5/1980 | Kittag | 352/180 |
| 4,366,501 | 12/1982 | Tsumekawa et al. | 354/432 |

*Primary Examiner*—Russell E. Adams
*Attorney, Agent, or Firm*—Robin, Blecker & Daley

[57] ABSTRACT

The disclosed image sensing device has a light measuring circuit for measuring the luminance of an object to be photographed or recorded and a photometric characteristic control circuit for shifting the photometric characteristic of the light measuring circuit from one characteristic to another according to change-over between a still picture taking mode and a motion picture taking mode. The photometric characteristic control circuit makes the photometric sensitivity distribution of the light measurement circuit more averaged or uniformalized in the motion picture taking mode than in the still picture mode.

36 Claims, 4 Drawing Sheets

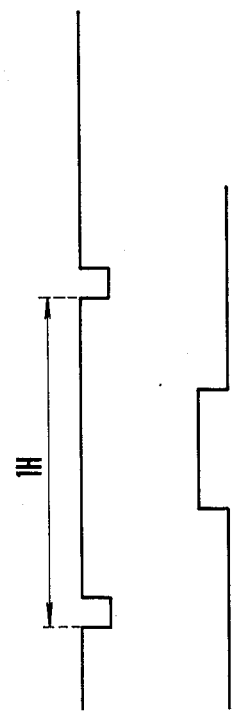
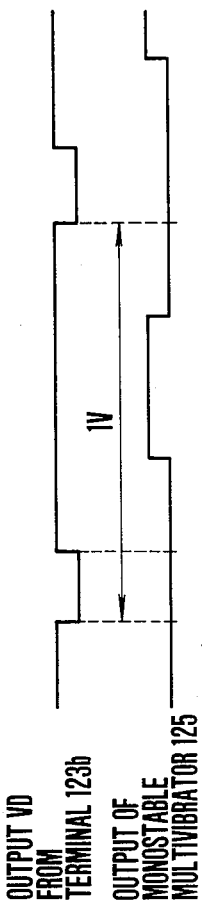
FIG. 4(a) OUTPUT HD FROM TERMINAL 123a
FIG. 4(b) OUTPUT OF MONOSTABLE MULTIVIBRATOR 124
FIG. 5(a) OUTPUT VD FROM TERMINAL 123b
FIG. 5(b) OUTPUT OF MONOSTABLE MULTIVIBRATOR 125

IMAGE SENSING APPARATUS

This is a continuation of application Ser. No. 682,797, filed Dec. 18, 1984.

BACKGROUND OF THE INVENTION

1. Field of the Invention

This invention relates to an image sensing apparatus which includes a solid state image sensor, etc. and has a still picture taking mode and a motion picture taking mode.

2. Description of the Prior Art

The conventionally known apparatuses for sensing images of objects to be photographed include, for example, video cameras.

In taking a still picture with a camera of this kind, one field portion of an image signal train of a standard television period has been merely extracted and recorded as a still picture. However, since the quality of a still picture obtained in this manner has been-poor, a demand exists for a still picture of higher quality. To meet this requirement, attempts have been made to make adjustment or various exposure parameters for the picture of a specific field. In one of such attempts, arrangement to permit selection of a suitable photometric sensitivity distribution in the still picture taking mode would make it possible to have the optimum photometric sensitivity distribution according to the luminance distribution of an object to be photographed.

However, it is naturally preferable to arrange the system of this kind to be capable of taking a motion picture as well as a still picture. However, the amount of image information of the still picture mode greatly varies from that of the motion picture mode. Therefore, arrangement to make fine exposure adjustment for the motion picture mode in the same manner as in the still picture mode would result in an excessively flickery picture.

SUMMARY OF THE INVENTION

It is a general object of this invention to solve the above-stated problems of the prior art and more specifically to provide an image sensing apparatus which is capable of carrying out light measurement appositely to the amount of information on the image of an object to be recorded.

It is another object of this invention to provide an image sensing apparatus which is capable of having the optimum photometric sensitivity distribution for each of still picture and motion picture taking modes.

To attain this object, an embodiment of this invention is arranged to ensure the optimum light measurement by varying the photometric characteristic thereof according to the amount of information on the image of an object to be recorded.

These and further objects and features of the invention will become apparent from the following detailed description of preferred embodiments thereof taken in connection with the accompanying drawings.

BRIEF DESCRIPTION OF THE DRAWINGS

FIGS. 4(a), 4(b), 5(a) and 5(b) are wave form charts showing the wave forms of outputs of the essensial parts of FIG. 3.

DETAILED DESCRIPTION OF THE PREFERRED EMBODIMENTS

Figure 1:
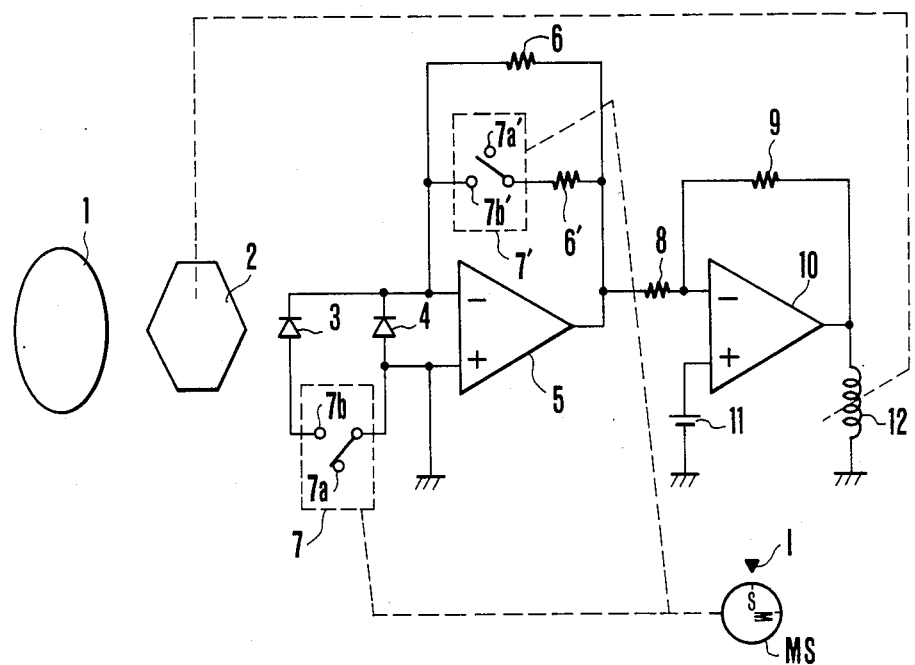
FIG. 1 is a circuit diagram showing a first embodiment of this invention.
Figure 2:
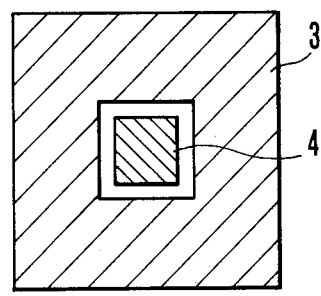
FIG. 2 is an illustration of the geometric allocation of photo-sensitive elements 3 and 4 of the same embodiment.

The following description shows the details of this invention with reference to the accompanying drawings. FIG. 1 shows the electric circuit arrangement of a first embodiment of this invention. The illustration includes a photometric optical system 1 and a stop 2 which are either arranged separately from those of a photo-taking system or arranged to be used in common with the photo-taking system. Photo-sensitive elements 3 and 4 which are provided for light measurement form light measuring means in conjunction with an amplifier 5 and a comparator 10. As shown in FIG. 2, the photo-sensitive element 4 is arranged to receive light in an area corresponding to the middle part of an image plane and the other element 3 to receive light in an area corresponding to the peripheral part of the image plane. The operational amplifier 5 has the cathode output terminals of the photo-sensitive elements 3 and 4 connected to its inversion (i.e. inverting) input terminal and also has its output terminal connected via a resistor 6 to its inversion input terminal. Further, the output terminal and the inversion input terminals are interconnected via a series circuit composed of an analog switch 7' and a resistor 6'.

The non-inversion (i.e. non-inverting) input terminal of the operational amplifier 5 is connected to the ground and to the anode of the photo-sensitive element 4 while the anode of the other photo-sensitive element 3 is connected to the non-inversion input terminal via an analog switch 7 which is arranged to serve as photometric characteristic control means. Further, the output terminal of the operational amplifier 5 is connected to the inversion input terminal of a comparator 10 via a resistor 8. Between the inversion input terminal and the output terminal of the comparator 10 is provided a resistor 9. A reference voltage generating circuit 11 is connected to the non-inversion input terminal of the comparator 10. The output terminal of the comparator 10 is connected to a stop driving coil 12. The stop 2 is operated in a closing direction when the driving coil 12 is driven with a negative voltage and in an opening direction when the coil 12 is driven with a positive voltage. The switches 7 and 7' are responsive to a mode selection dial MS which is arranged to serve as mode selecting means. A reference symbol I denotes an index.

In photographing in the still picture taking mode, the analog switches 7 and 7' are respectively shifted to their positions 7a and 7a'. Then, the photo-sensitive element 4 alone becomes operative. Light measurement is accomplished with the middle part of the image plane used alone. A light flux which is imaged on the photo-sensitive element 4 via the optical system 1 and the stop 2 is converted by the operational amplifier 5 into a voltage value according to the quantity of light thereof. The voltage thus obtained is supplied to the comparator 10. When the output voltage of the operational amplifier 5, i.e. the output voltage of a photo-electric conversion circuit, is lower than the reference voltage of the reference voltage generating circuit 11, i.e. in case that the intensity of the incident light is lower than the output voltage value of the reference voltage generating circuit 11 which represents a value necessary for photographing, the comparator 10 produces a positive output. The stop driving coil 12 is then driven with a positive voltage to open the stop 2. This increases the quantity of light incident upon the photo-sensitive element 4. Meanwhile, in case that the intensity of the incident light is higher than the value necessary for photographing and thus the output voltage of the operational amplifier 5 is higher than the reference voltage of the reference voltage generating circuit 11, the output of the comparator 10 becomes negative. Then, the stop driving coil 12 is driven with a negative voltage to operate the stop 2 in the closing direction. This decreases the quantity of light incident on the photo-sensitive element 4. With these increasing and decreasing adjustment repeatedly carried out by controlling the aperture of the stop, the photo-sensitive element 4 comes to have light incident thereon at a constant intensity.

When the mode is shifted to the motion picture taking mode, the embodiment operates as follows: In this case, the analog switches 7 and 7' are respectively shifted to their positions 7b and 7b'. This brings about a state in which the photo-sensitive elements 3 and 4 are interconnected. The light flux imaged on the photo-sensitive elements 3 and 4 via the optical system 1 and the stop 2 is converted into a voltage proportionate to the intensity of the light of the whole image plane by the photo-electric conversion circuit which is composed of the operational amplifier 5. The output terminal of the operational amplifier 5, in this case, is connected to the inversion input terminal thereof via the resistor 6 and a shunt circuit of the resistor 6'. The shunt ratio of the shunt circuit is arranged to bring about no change in gain by setting it in consideration of the ratio to a photo current output obtainable with the photo-sensitive element 4 alone used for light measurement. Further, the light quantity control is carried out in the same manner as in the case where the photo-sensitive element 4 is used alone and, therefore, is omitted from description here. The embodiment has been described, for the sake of simplification of description, as using two photo-sensitive elements. However, three or more photo-sensitive elements may be arranged to permit gradual variations in the light measurement range in association with the focal length, etc. In the foregoing, light measurement is described by way of example as carried out with the aperture of the stop stopped down. However, it goes without saying that the same concept as described above is also applicable to a system where light measurement is carried out at a maximum aperture; the result of light measurement is computed and stored; and exposure control members such as the stop and a shutter, etc. are controlled on the basis of a value thus stored.

Figure 3:
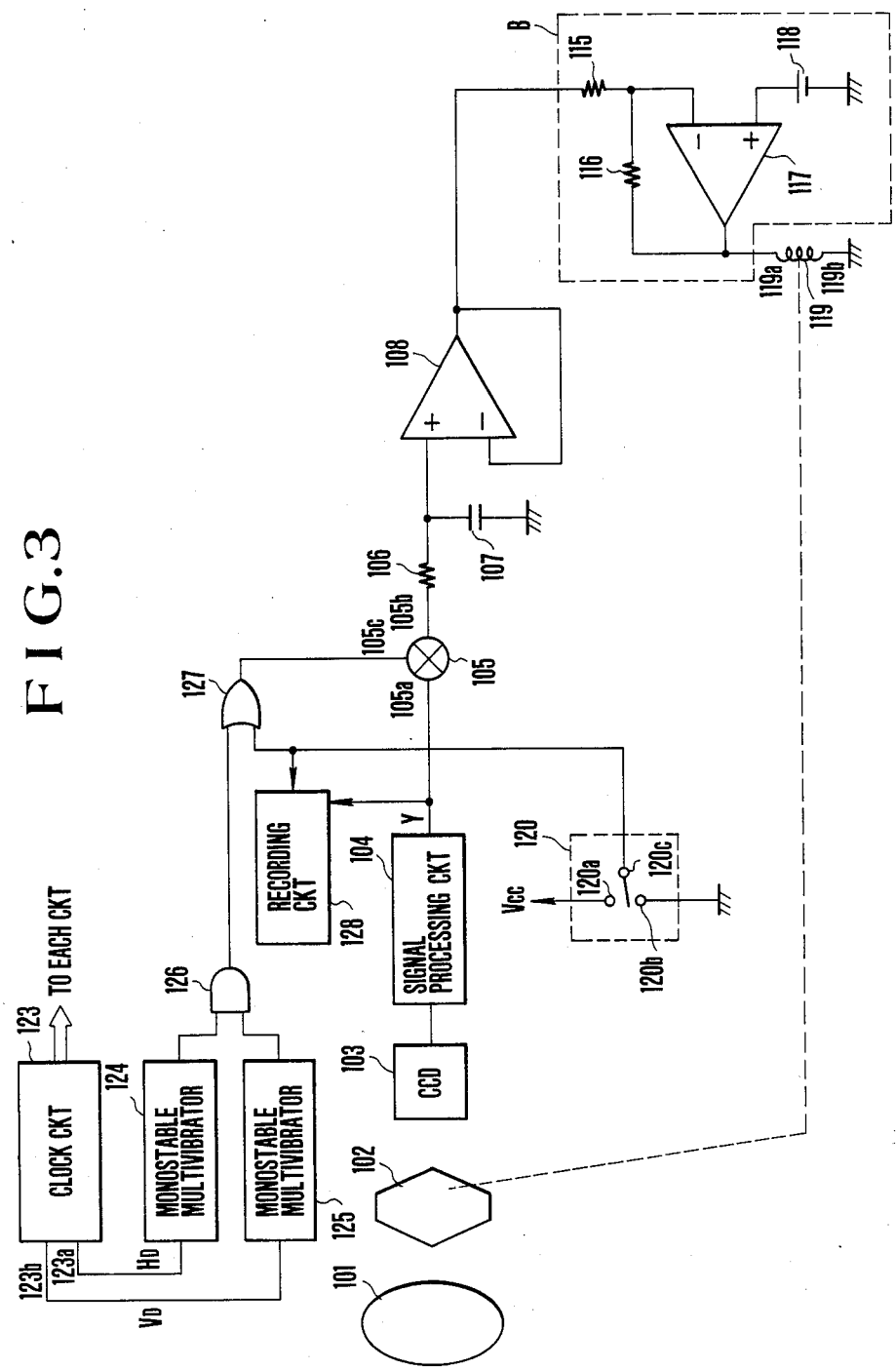
FIG. 3 is a circuit diagram showing a second embodiment of this invention.

FIG. 3 shows the circuit arrangement of a second embodiment of this invention. In this case, the invention is applied to an electronic camera using an image sensor such as a CCD or the like. The illustration includes a photo-taking optical system 101; a stop 102; and an image sensor 103 which is a CCD or the like. The output of the image sensor 103 is supplied to a signal processing circuit 104. The output of the signal processing circuit 104 is guided to a recording device 128 and is arranged to be supplied also to one terminal of a capacitor 107 via a series circuit consisting of an analog switch 105 and a resistor 106. The other terminal of the capacitor 107 is connected to the ground. An operational amplifier 108 is arranged in the form of a voltage follower with the output terminal and the input terminal thereof directly interconnected. One terminal of the above-stated capacitor 107 is connected to the non-inversion input terminal of the operational amplifier 108. The output of the operational amplifier 108 is arranged to be supplied to an inversion amplifier B which consists of an operational amplifier 117, a reference voltage generating circuit 118 and resistors 115 and 116. The output terminal of the inversion amplifier B is connected to a stop driving coil 119. The stop driving coil 119 is arranged to open the stop aperture when a terminal 119a thereof is driven with a positive voltage and to close or stop down the aperture when the terminal 119a is driven with a negative voltage. An analog switch 120 has a terminal 120a thereof connected to a positive power supply, a terminal 120b thereof to the ground and another terminal 120c to an OR circuit 127.

A clock circuit 123 is arranged to produce a horizontal synchronizing signal HD from a terminal 123a thereof. The signal HD is arranged to be supplied via a monostable multivibrator 124 to one of two input terminals of an AND gate 126. The clock circuit 123 produces a vertical synchronizing signal VD from another terminal 123b. The vertical synchronizing signal VD is arranged to be supplied via a monostable multivibrator 125 to the other input terminal of the AND gate 126.

A 2-input OR gate 127 has the output terminal of the AND gate 126 connected to one input terminal thereof and that of the analog switch 120 connected to the other input terminal. The output terminal of the OR gate 127 is connected to the control terminal 105c of the analog switch 105. Light meauring means are formed by the elements 103–108 and 117 while photometric characteristic control means is formed by the elements 123–127.

Figure 6:
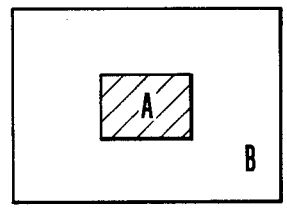
FIG. 6 is an illustration of photometric sensitivity distribution in a still picture mode.

The second embodiment of this invention which is arranged as described above operates as described below with reference to FIGS. 4(a), 4(b), 5(a) and 5(b):

First, in the still picture photographing mode, the embodiment operates in the following manner: In this case, the connecting position of the terminal 120c of the analog switch 120 is switched over to the terminal 120b thereof. The OR gate 127 then has one input thereof at a low level. Threfore, the output of the OR gate 127 is determined by the other input which is the output of the AND gate 126. Referring to the timing charts of FIGS. 4(a), 4(b), 5(a) and 5(b), the wave form of the horizontal synchronizing signal HD produced from the terminal 123a of the clock circuit 123 is as shown in FIG. 4(a). The monostable multivibrator 124 then generates according to this signal HD a pulse which becomes a high level at a part of a horizontal scanning period as shown in FIG. 4(b). Meanwhile, the vertical synchronizing signal VD which is produced from the terminal 123b of the clock circuit 123 has a wave form as shown in FIG. 5(a). The monostable multivibrator 125 generates, according to this signal VD, a pulse which becomes a high level at a part of a vertical scanning period as shown in FIG. 5(b). Since the AND gate 126 is provided for the outputs of these two monostable multivibrators, the output level of the AND gate 126 becomes high at parts of both the horizontal and vertical image planes. In other words, it becomes a high level at a part A of the whole picture plane as indicated by hatching in FIG. 6. Accordingly, the output level of the control terminal of the analog switch 105 also becomes high at the same part within the whole picture plane. Then, a luminance signal corresponding to this part alone is transmitted to ensuing elements including a low-pass filter which consists of the resistor 106 and the capacitor 107. Elements other than this switch arrangement operate as follows:

An image of the object to be photographed is formed on the image sensor 103 by the optical system 101 via the stop 102. The luminance component of the image is extracted by allowing the photo-electric conversion output of the image sensor to pass through the signal processing circuit 104. The luminance compoennt is then supplied via the analog switch 105 to the low-pass filter consisting of the resistor 106 and the capacitor 107. The average value of the luminance signal representing the luminance of the area A which is shown in FIG. 6 is thus supplied to the operational amplifier 108 which is arranged in the form of a voltage follower. The output terminal of the operational amplifier 108 then produces a voltage of the same value as the input. The output of the operational amplifier 108 is then supplied to the inversion amplifier B. In the event that the average value of the luminance applied to the above-stated middle part or area A is higher than a desired value, the output of the inversion amplifier B becomes negative. The negative output comes to drive the terminal 119a of the stop driving coil 119 with a negative voltage to operate the stop in the closing direction. As a result of this, the intensity of light incident on the image sensor 103 decreases. Conversely, if the average value of the luminance applied to the part A is lower than the desired value, the output of the inversion amplifier B becomes positive. The terminal 119a of the stop driving coil 119 is then driven with a positive voltage to oprate the stop in the opening direction, so that the intensity of light incident on the image sensor 103 can be increased. In this manner, the quantity of light incident on the part A is controlled to eventually become unvarying.

In this specific embodiment, the part B excluding the hatched part is not weighted. However, the part B other than the hatched part may be arranged to reflect also the luminance signal by inserting a resistor in parallel with the analog switch 105.

Next, when the mode of the embodiment is shifted to the motion picture taking mode, the operation of the embodiment is as follows: The analog switch 120 is in this case connected to the terminal 120b thereof which is on the positive potential side. The analog switch 120 thus allows the OR gate 127 to have an input always at a high level. Unlike in the case of the still picture taking mode, therefore, the output level of the OR gate 127 becomes hrgh. Accordingly, a luminance signal representing the whole image plane comes to be always supplied via the analog switch 105 to the low-pass filter consisting of the resistor 106 and the capacitor 107. The output of the low-pass filter is supplied to the operational amplifier 108. In the motion picture mode, the average quantity of light incident on the whole image plane is thus controlled to be unvarying.

Figure 7:
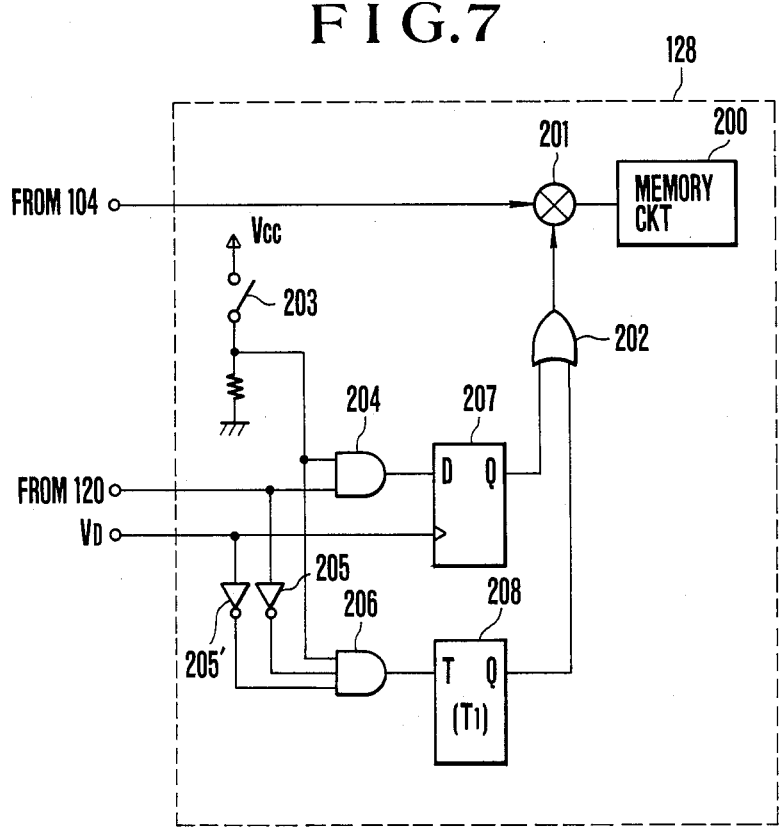
FIG. 7 is a circuit diagram showing the arrangement of a recording device.

FIG. 7 shows, by way of example, the details of the recording device 128. The recording device 128 includes a memory circuit 200 which is arranged to store recording information and is, for example, provided with a magnetic sheet or the like. An analog gate 201 is arranged to be opened for different periods according to the still picture or motion picture taking mode. The recording device further includes an OR gate 202, a release switch 203; AND gates 204 and 206; inverters 205 and 205'; a D flip-flop 207; and a T flip-flop. In the motion picture mode, the output level of the switch 120 becomes high. Therefore, the output of the AND gate 204 remains at a high level while the release switch is on. The level of the output Q of the flip-flop 207 thus becomes high in synchronism with a vertical synchronizing signal. The output Q opens the gate 201 via the OR gate 202. This allows the signal of the signal processing circuit 104 to be supplied to the memory circuit 200. In the motion picture mode, the video signal which is continuously read out from the image sensor 103 in synchronism with the vertical synchronizing signal VD is stored in synchronism with the vertical synchronizing signal VD.

In the case of the still picture taking mode on the other hand, the output of the switch 120 is at a low level. The output of the AND gate 204 is therefore always at a low level. The AND gate 206 produces a high level output as long as the release switch 203 is on and the vertical synchronizing signal VD remain at a low level. The output Q of the flip-flop 208 is at a high level for a predetermined period of time (T1: one field period) after the rise of the high level signal. Therefore, during this period, the gate 201 is open and the video signal is stored or recorded. In the still picture mode, just one field period portion of the video signal is thus stored (or recorded) in synchronism with a vertical synchronizing signal VD first obtained after shutter release.

In the embodiment, as described above, the photometric sensitivity distribution is shifted according to the still picture mode or the motion picture mode, for example, between a center preponderant photometry and an averaging photometry for more uniformalized light measurement. In the still picture taking mode, an apposite exposure value is obtained for an object located at a desired part (or in the middle part) of the image plane. In the motion picture taking mode, an apposite exposure is obtained for the whole image plane. Therefore, even in the event of an object moving, for example, from the left to the right of the image plane, the motion picture taking mode gives a stable picture without excessive changes in the exposure for the object and the background thereof.

Further, in accordance with the arrangement of this specific embodiment, the spot or center preponderant photometric arrangement is used for te middle part in the still picture mode and the averaging photometric arrangement in the motion picture mode. However, this invention is not limited to such arrangement. This invention includes arrangement to have a desired photometric sensitivity distribution selectable in the still picture mode; and to automatically shift the photometric sensitivity distribution to more averaging light measurement following a switch-over to the motion picture mode. Such automatic shifting arrangement permits exposure control without giving any unnatural impression in the motion picture mode. In the embodiment, the still picture mode is arranged to record only a single image plane. However, the advantageous effect of this invention is attainable also by arrangement to record a number of image planes less than the number of image planes to be recorded in the motion picture mode. In the embodiment, a memory such as a magnetic sheet or the like is employed as recording means. However, in accordance with this invention, the recording means usable include means for recording an image directly or indirectly on a photo-sensitive material such as a silver halide film material. In the specific embodiment described, the photometric characteristics is arranged to be variable by changing the photometric sensitivity distribution. However, this invention is not limited to this. In accordance with this invention, any arrangement that makes the amount of photometric information variable for forming a light measurement signal may be employed. Further, in accordance with this invention, any arragement that changes the photometric characteristic by relatively averagin or uninformlizing the information on the object to be recorded or by mainly using a part of the object information in forming the light measurement information is employable.

What is claimed is:

1. An image sensing apparatus, comprising:
   (a) photometric means for measuring the luminance of an object to be photographed:
   (b) mode selection means for selecting the image sensing mode of the image sensing apparatus between a one-shot picture taking mode and a continuous picture taking mode; and
   (c) characteristic control means arranged to change the photometric characteristic of said photometric means according to the selected position of said mode selection means.

2. An image sensing apparatus according to claim 1, wherein said photometric means includes a plurality of photosensitive elements which are arranged to have the light of different parts of said object incident thereon.

3. An image sensing apparatus according to claim 2, wherein said photometric means includes at least a first photosensitive element which receives the light of the middle part of an image to be recorded and a second photosensitive element which receives the light of a peripheral area around the middle part.

4. An image sensing apparatus according to claim 1, further comprising an image sensor which is arranged to convert an image of the object into an electrical signal.

5. An image sensing apparatus according to claim 1, being arranged to record only one image plane portion of the image of the object when the apparatus is in the one-shot picture taking mode.

6. An image sensing apparatus according to claim 1, being arranged to record a plurality of image plane portions of the image of the object when the apparatus is in the continuous picture taking mode.

7. An image sensing apparatus according to claim 4, wherein said photometric means is arranged to measure the luminace of the object by using the output of said image sensor.

8. An image sensing apparatus according to claim 4, wherein said image sensor includes a solid-state image sensor.

9. An image sensing apparatus according to claim 1, wherein said characteristic control means is arranged to cause said photometric means to have a photometric characteristic emphasizing importance to the light of a first area within the image plane to be recorded when the apparatus is in the one shot picture taking mode; and to have a photometric characteristic emphasizing the light of a second area larger than the first area within the image plane to be recorded when the apparatus is in the continuous picture taking mode.

10. An image sensing apparatus according to claim 1, wherein said photometric means possesses a plurality of different photometric characteristics which are arranged to be selectable.

11. An image sensing apparatus according to claim 1, wherein said characteristic control means is arranged to control the photometric sensitivty distribution characteristic of said photometric means.

12. An image sensing apparatus according to claim 1, further comprising varying means for varying the degree of exposure of the image sensing apparatus according to the output of said photometric means.

13. An image sensing apparatus according to claim 12, wherein said exposure degree varying means includes aperture driving means.

14. An image sensing apparatus, comprising:
   (a) means for measuring the luminance of an object to be recorded, said means being arranged to have the measuring characteristics thereof variable;
   (b) recording means for recording at least one image information of the object; and
   (c) characteristic control means for controlling the measuring characteristic of said measuring means according to the number of image informations to be recorded by said recording means, so as to carry out the luminance measurement of the image in the wider range, the greater the number of image informations to be recorded in said recording means.

15. An image sensing apparatus according to claim 14, wherein said recording means including image sensing means which converts an image of the object into electrical image information; and memory means which records the output of said image sensing means.

16. An image sensing apparatus according to claim 14, wherein said characteristic control means controls said measuring means to have a measuring characteristic attaching importance to a first area within the image plane to be recorded when the number of image informations is a first number; and to have a measuring characteristic attaching importance to a second area larger than said first area within the image plane to be recorded when the number of said image informations is a second number greater than said first number.

17. An image sensing apparatus according to claim 14, further comprising selection means for selecting the number of image informations to be recorded.

18. An image sensing apparatus according to claim 14, wherein said measuring means includes a plurality of photosensitive elements which are arranged to have the light of different parts of said object incident thereon.

19. An image sensing apparatus according to claim 18, wherein said measuring means includes at least a photo-sensitive element which receives the light of the middle part of an image to be recorded and a photo-sensitive element which receives the light of a peripheral area around the middle part.

20. An image sensing apparatus according to claim 15, wherein said measuring means is arranged to measure the luminance of the object by using the output of said image sensing means.

21. An image sensing apparatus according to claim 15, wherein said measuring means includes a solid-state image sensor.

22. An image sensing apparatus according to claim 14, wherein said characteristic control means is arranged to control the sensitivity distribution characteristic of said measuring means.

23. An image sensing apparatus according to claim 14, further comprising varying means for varying the degree of exposure of the image sensing means according to the output of said measuring means.

24. An image sensing apparatus according to claim 23, wherein said exposure degree varying means includes aperture driving means.

25. An image sensing apparatus, comprising:
(a) means for measuring the luminance of an object to be recorded, said means being arranged to have the measuring characteristic thereof variable;
(b) selection means for selecting the number of images to be recorded within the image sensing apparatus; and
(c) characteristic control means for varying the measuring characteristic of said measuring means according to the number of images selected by said selection means, so as to carry out the luminance measuring the image in the wider range, the greater the number of images selected to be recorded by said selection means.

26. An image sensing apparatus according to claim 25, wherein said characteristic control means controls said measuring means to have a measuring characteristic attaching importance to a first area within the image plane to be recorded when the number of images selected by said selection means is a first number; and to have a measuring characteristic attaching importance to a second area within the image plane when the number of images selected is a second number greater than said first number.

27. An image sensing apparatus according to claim 25, wherein said characteristic control means is arranged to control the sensitivity distribution characteristic of said measuring means.

28. An image sensing apparatus according to claim 25, wherein said characteristic control means is arranged to make said measuring characteristic more uninformalized according as the number of images selected increases.

29. An image sensing apparatus according to claim 28, wherein said characteristic control means is arranged to form a light measurement signal using a greater amount of light measurement information according as the number of images selected increases.

30. An apparatus having a one-shot picture taking mode and a continuous picture taking mode, comprising:
(a) means for measuring luminance of said image; and
(b) means for controlling said measuring means such that said measuring means measures a first area within said image to be recorded when said apparatus is in the one-shot picture taking mode, said measuring means measures a second area larger than said first area within said image to be recorded when the apparatus is in the continuous picture taking mode.

31. An apparatus according to claim 30, further comprising means for recording an image to be measured by said measuring means.

32. An apparatus according to claim 20, wherein said first area and said second area are symmetrical to each other.

33. An apparatus according to claim 31, wherein said record means includes memory means.

34. An apparatus according to claim 30, wherein said measuring means includes an area type image sensor.

35. An apparatus according to claim 30, wherein said one shot picture taking mode is a mode in which a picture of one field is taken.

36. An apparatus according to claim 30, wherein said continuous picture taking mode is a mode in which a picture of plane fields is continuously taken.

* * * * *